United States Patent [19]

Pollack et al.

[11] Patent Number: 4,982,055
[45] Date of Patent: Jan. 1, 1991

[54] SEALED ELECTRICAL FEEDTHROUGH DEVICE

[75] Inventors: Michael J. Pollack, Lansdale; John Lawson, Hatfield, both of Pa.

[73] Assignee: Three E. Laboratories Inc., Lansdale, Pa.

[21] Appl. No.: 442,892

[22] Filed: Nov. 29, 1989

[51] Int. Cl.$^5$ ............................................. H01R 13/74
[52] U.S. Cl. ..................... 174/151; 439/551; 439/559
[58] Field of Search ................ 174/18, 65 SS, 151, 174/152 R, 150 GM, 153 R; 439/544, 550, 551, 559, 562, 564, 565, 908

[56] References Cited

U.S. PATENT DOCUMENTS

| | | | |
|---|---|---|---|
| 2,470,066 | 5/1949 | Calabrese | 174/152 R |
| 3,376,169 | 4/1968 | Davis et al. | 174/65 SS X |
| 3,613,048 | 10/1971 | Brundza | 439/551 X |

FOREIGN PATENT DOCUMENTS 602437  5/1948  United Kingdom ............... 439/551

OTHER PUBLICATIONS

Knight, R. D., "Vacuum Feed-Through Bushing", *IBM Technical Disclosure Bulletin*, vol. 2, No. 4, Dec. 1959, p. 9, , copy in 174-152 R.

*Primary Examiner*—Laramie E. Askin
*Attorney, Agent, or Firm*—William E. Cleaver

[57] ABSTRACT

The feedthrough device includes first and second half housing members, each of which has an internal chamber. The feedthrough device further includes a removable header member that fits within the chambers of the first and second half housing members when they are threaded together. The first half housing member has a threaded protrusion which fits into a threaded aperture located in the wall of a sealed structure, such as the wall of a vacuum furnace. The threaded protrusion arrangement includes a first "O" ring which seals the periphery of the aperture in the wall of the sealed structure. The header has first connectable terminals on one end and second connectable terminals on the other end. In between the first and second connectable terminals of the header there is located a plate member which fits along the edge of the first half housing member chamber; and located between that edge and the plate is a second "O" ring. Wires connecting the first and second terminals pass through the plate member in a sealed arrangement. The second half housing member has an abutting structure located at the end of its chamber so that when the second half housing member threads with the first housing member, the plate is pushed by the abutting structure to squeeze the second "O" ring to complete a seal of the first half housing member chamber. Accordingly, the first connectors are sealed against the outside world, but are connected to the circuitry within and outside of the sealed structure.

9 Claims, 2 Drawing Sheets

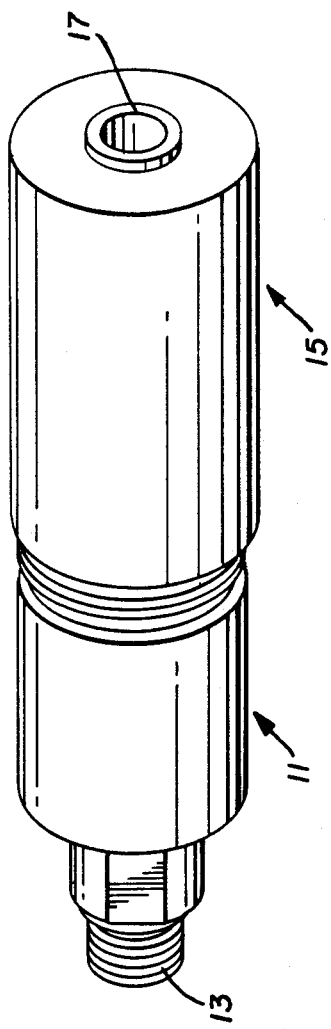
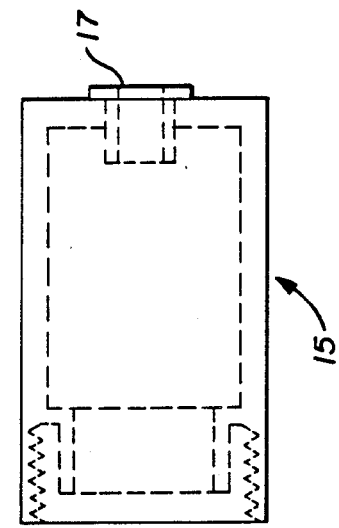
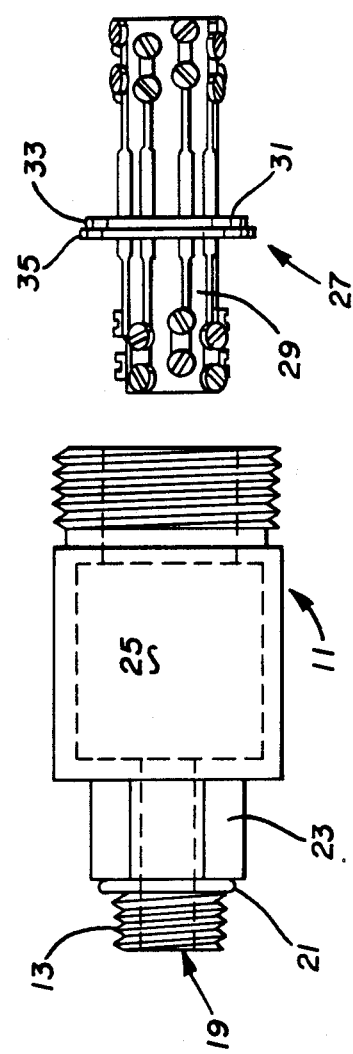

SEALED ELECTRICAL FEEDTHROUGH DEVICE

BACKGROUND OF THE INVENTION

The problems associated with providing electrical continuity from the inside of a sealed chamber to the outside world, without permitting leaks into the sealed chamber, are manifold and have been a challenge to those skilled in the art for a long period of time. The devices which enable wires, or cables, to pass from, for instance, a thermocouple located inside of a vacuum furnace chamber to the outside of the vacuum furnace chamber are identified as feedthrough devices. In the prior art the feedthrough devices include a housing member which threads into the chamber wall of the sealed chamber. The threads of the housing member have been wrapped in polytetrafluoroethylene tape to ensure a seal of the grooves around the threads. In the prior art there is a tube-like structure formed, within the feedthrough housing, so that wires from thermocouples, for instance, are passed through the tube-like structure. The end of the tube-like structure has a flared design and into the flared end there is located a tapered plug. The tapered plug has generally been polytetrafluoroethylene. The tapered has a hole (or holes) therethrough which accommodates the wires of the thermocouples. The tapered, or cone-shaped, plug is literally threaded onto, or passed over, the wires and is pushed into the flared end of the tube-like structure to effect a seal. The arrangement has at least five major problems. The prior art arrangement is not easy to employ in the field because "threading" the wires through the plug is difficult. The "threading" of the wires through the tapered plug is difficult because the holes in the tapered plug are of a small diameter, that is, of virtually the same diameter as the wires being passed therethrough, in order to create a seal. In addition, since the wires are very thin, they are mechanically weak, which adds to the difficulty. Secondly, after a period of time the polytetrafluoroethylene wrapping on the threaded extension "cold flows", or creeps, and the same is true of the tapered plug. Accordingly, the wrapping and plug no longer effect a compression around the pipe and the wires and they permit gases or air to pass along the threads as well as through the tapered plug. Thirdly, the prior art arrangement cannot accommodate a large number of wires coming from the chamber. Fourthly, the prior art arrangement does not provide the flexibility that is provided by the present arrangement. In addition, the prior art arrangement can only accommodate a limited temperature range in its use. In the present arrangement, there is employed a removable header and, hence, different headers can be employed to accommodate different uses of the feedthrough mechanism. The present header features a glass-to-metal bond which permits the wires from one side of the header to pass through a plate to the other side of the header while maintaining a very good seal over a relatively large range of temperatures.

SUMMARY OF THE INVENTION

The present system will be described in connection with its use with a vacuum furnace system although, indeed, it can be advantageously used with other technologies such as sealing one environment from another environment, e.g., a corrosive environment from a non-corrosive environment, in a chemical process. A major problem, in the vacuum furnace art, is the problem of getting a plurality of temperature readings from within the vacuum chamber so that the heat treating personnel can determine what the temperatures are at various locations on the hearth. Obtaining a plurality of readings is accomplished by locating a plurality of thermocouples within the vacuum furnace, and providing electrical wires from the thermocouples, through the chamber space, through the wall of the chamber, to some temperature recording device located on the outside of the furnace chamber. Obviously the means to enable the wires to pass through the chamber wall includes a means to seal the feedthrough mechanism. The present system includes two halves of a housing with the second half housing being formed to be threaded onto the first half housing. Each half housing has a hollowed-out section. The first half housing has a protrusion, which has an aperture therethrough and which is threaded. The aperture through the protrusion is available to pass wires from the thermocouples into the hollowed-out section of the first half housing. When the first half housing is in use, the protrusion is threaded into an aperture which extends through the chamber wall. An "O" ring is fitted over the threaded section of the protrusion so that when the first half housing is threaded up into the chamber wall, the "O" ring will be squeezed to create a seal of the aperture into which the protrusion fits. The hollowed-out section of the first half housing opens into the end of the first half housing which lies away from the threaded protrusion. There is a rabbet, or ledge, formed around the periphery of the hollowed-out section of the first half housing. A second "O" ring is placed around the ledge in the hollowed-out section of the first half housing. The second housing has an open end oriented to face the open end of the first half housing. Around the entrance to the hollowed-out section of the second half housing there is located a cylindrical ram-like structure. At the end of the second half housing which lies away from the open end, there is an aperture to accept wires from a temperature recorder. Within the housing hollowed-out chamber, (formed by the hollowed-out sections of the first and second housing halves being joined), there is employed a header assembly. The header assembly comprises an elongated member, with first and second ends and with a plate member which is formed and located to be orthogonal to the axis of the elongated member and located at the center thereof. Terminal members are mounted on the first and second ends of the elongated member and the circuit paths connecting the terminal members on the first and second ends pass through apertures in the plate member. The last mentioned apertures are filled with glass and the glass is bonded to the metal plate member so that there are no leak paths through the plate member where the circuit paths pass.

When the feedthrough assembly is assembled, the first end of the elongated member is placed into the hollowed-out section of the first half housing. By so doing, the plate member abuts the second "O" ring which is resting on the ledge. When the second half housing is threaded onto the first half housing, the cylindrical ram member forces the plate member against the second "O" ring (which is resting on the ledge), thereby creating a seal for the periphery of the open end of the first half housing. Since the glass members, which are bonded in the apertures of the plate member, act to seal the wires passing therethrough, the combination seals the hollowed-out section of the first half housing from the outside world (including the hollowed-out section of the second half housing) and at the same time seals the vacuum furnace from the outside world while permitting passage of wires from the vacuum furnace chamber into the hollowed-out section of the first housing. Accordingly, wires from the thermocouples pass through the aperture in the threaded protrusion and are connected to the terminals on the first end of the elongated member. The circuit paths which are connected between the first end terminals and the second end terminals provide electrical continuity into the hollowed-out section of the second half housing. Finally, the circuitry from the temperature recorder is passed through the end aperture of the second half housing to be connected to the second terminals. It should be understood that other forms of headers can be employed with other sealing techniques to accommodate various uses of feedthrough devices.

The objects and features of the present invention will be better understood when the following description is considered in conjunction with the drawings, wherein:

FIG. 1 is a pictorial view of the two housing halves threaded together;

FIG. 2 is a layout of three parts that make up the assembly; and

Figure 3:
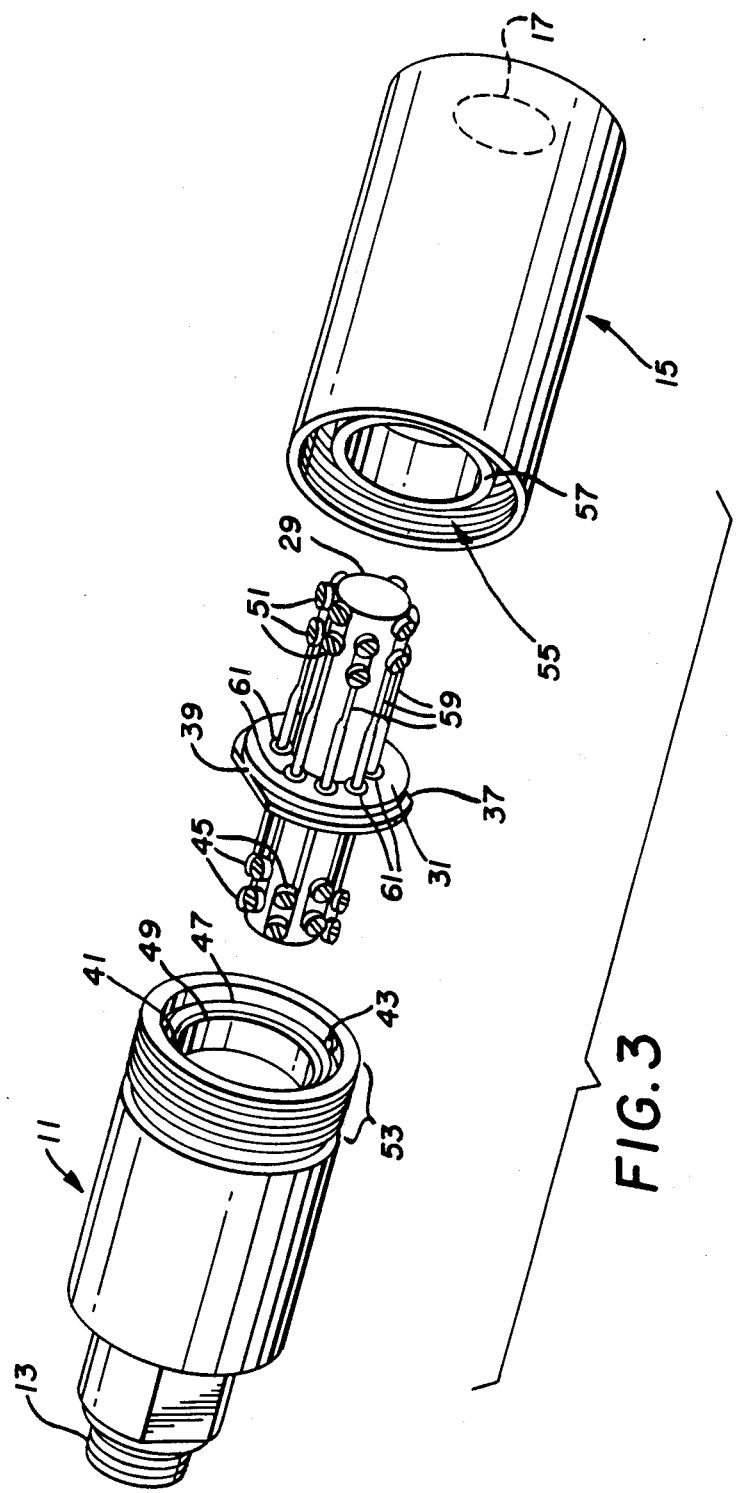
FIG. 3 is an exploded pictorial view to show the cylindrical ram, the glass which is bonded to metal and the internal "O" ring.

Consider FIGS. 1, 2, and 3. In FIGS. 1 and 2 there is shown the first half housing 11 which has a threaded protrusion 13 formed to extend therefrom. Also in FIGS. 1 and 2 there is shown the second half housing 15 which has the outside aperture 17 formed therein. As will be better recognized in FIG. 2, the threaded protrusion 13 has an aperture 19 formed therein. The threaded protrusion 13 is threaded into the chamber wall of a sealed chamber, such as the wall of a vacuum furnace. As can be gleaned from FIG. 2, there is an "0" ring 21 positioned over the threaded protrusion 13. When the first half housing 11 is threaded up into the chamber wall, the nut-like base 23 squeezes the "O" ring 21 against the chamber wall to form a seal for the threaded grooves so that no gas, or air, can enter the vacuum chamber along the grooved paths of the threaded protrusion 13.

Wires from the inside of the vacuum furnace chamber, such as wires from thermocouples, are passed through the aperture 19 into the hollowed-out section 25 of the first half housing 11. It should be understood that the aperture 19 is relatively large and accordingly a relatively large number of wires can be passed from the inside of the vacuum furnace chamber into the first half housing 11.

Further in FIG. 2 note that there is a header assembly 27. The header assembly 27 is made up of a non-electrical-conducting elongated terminal holder 29 separated into two halves by a metal plate member 31.

The metal plate member 31 has a lower ridge 33 formed therein as well as an upper ridge 35 formed thereon. The upper ridge 35 and the lower ridge 33 each has a flattened section. The flattened sections 37 and 39 are depicted in FIG. 3. The flattened sections allow the header assembly 27 to slip over the studs 41 and 43 (FIG. 3). When the header assembly 27 is slightly twisted, the studs 41 and 43 "ride" on the lower ridge 33 while the upper ridge 35 is behind the studs 41 and 43 and acts to keep the header assembly 27 locked into the first half housing 11.

Prior to locking the header assembly 27 into the first half housing 11, the wires from the thermocouples are passed through the aperture 19 and are fastened to the terminals 45 on the first end of the elongated terminal holder 29. Then the first end of the header assembly 27 is located in the first half housing 11 and the plate member 31 is locked as just described. The first half housing 11 has a hollowed out section which permits the wires connected to the terminals to be expanded and, hence, the extra length of wire, needed to exit from the first half housing 11 in order to be connected to the terminals 45, is accommodated. It should also be noted that prior to connecting the wires to the terminals 45, an internal "O" ring 47 (depicted in FIG. 3) is inserted in the open end of the first half housing 11. The "O" ring 47 is held by a cylindrical protrusion 49 so that when the plate member 31 is locked (as described above) it abuts the "O" ring 47.

Next the wires from the temperature recording device, or devices, are brought through the aperture 17 to be connected to terminals 51 located on the second end of the elongated terminal holder 29. The second half housing 15 also has a relatively large hollowed out section which permits the excess lengths of the wires to expand therein when the second half housing 15 is threaded onto the first half housing 11. Note the external threads 53 on the first half housing 11 and the internal threads 55 formed in the second half housing. The foregoing threading arrangement permits the second half housing 15 to be threaded onto the first half housing 11. When the second half housing 15 is threaded onto the first half housing 11, the cylindrical ram 57 pushes the plate member 31 against the "O" ring 47 to create a seal between the plate member 31 and the hollowed-out section of the first half housing 11.

As mentioned in the summary, the circuit paths 59 (wires in the preferred embodiment) pass from the first side of the elongated terminal holder 29, through glass sealer members 61 to the second side of the elongated terminal holder 29. The glass sealer members 61 are bonded and sealed to the metal plate 31 and effect a seal of the circuit paths so that no gas, or air, passes to or from the hollowed-out section of the first half housing through the metal plate member to the outside world (including the second half housing 15).

The present arrangement provides a good seal for the vacuum furnace chamber. In addition, it accommodates many more wires than do the prior art arrangements. It should also be noted that it is relatively easy to assemble, particularly when compared to the prior art arrangements wherein the user had to "thread", or pass, wires through conically shaped plug. The present arrangement also provides flexibility in that the header assembly can be designed in many ways to accommodate different technologies. Further, because the seals are created by glass-to-metal bonds and by "O" rings, the present assembly can be employed over a large range of temperatures.

Even further, the present arrangement does not give rise to broken seals along the electrical paths as is true in the prior art. In the prior art, the field engineer tends to break the seal around the wires when threading the plug or when forcing the plug into the flared end. In the present system, the seal is prearranged, secured and tested in the factory where the feedthrough is manufactured, which is prior to the field engineer ever using it. The practice of doing the sealing at the factory provides great reliability.

We claim:

1. A sealed feedthrough for connecting first electrical circuitry means, disposed on a first side of a separator wall, with second electrical circuitry means disposed on a second side of said separator wall, wherein said separator wall has a first aperture therein, comprising in combination.

first half housing means having first and second ends and formed to have a hollowed-out section opening into said second end, said first half housing means further having securing means formed at said first end thereof to enable said first half housing means to be secured to said second side of said separator wall, said securing means formed to have a second aperture therethrough, said second aperture disposed to lie in alignment with said first aperture whereby said first electrical circuitry means can pass from said first side of said separator wall, through said second aperture when said securing means is secured to said second side of said separator wall;

header means having third and fourth electrical circuitry means mounted thereon, said third electrical circuitry means formed to have electrical terminals with said electrical terminals disposed to be connectable to said first electrical circuitry means within said hollowed-out section of said first half housing means, said fourth electrical circuitry means connected to said third electrical circuitry means and formed to have electrical terminals with said electrical terminals disposed to be connectable to said second electrical circuitry means, said header means further formed to be placed in abutment with said first half housing means to effect a seal of said hollowed-out section of said first half housing means;

second half housing means having first and second ends and formed to have a hollowed-out section which opens into said last-mentioned first end and formed to have a third aperture in said last-mentioned second end whereby said second electrical circuitry means can be passed through said third aperture to be connected to said electrical terminals of said fourth electrical circuitry means within said hollowed-out section of said second half housing means, and further formed to be joinable with said first half housing means and to have a ram-like abutting means disposed at said last-mentioned first end, whereby when said second half housing means is joined with said first half housing means, said ram-like abutting means pushes said header means to complete a seal of said hollowed-out section of said first half housing means.

2. A sealed feedthrough according to claim 1, wherein said aperture in said separator wall is threaded and wherein said securing means of said first half housing means includes a threaded protrusion.

3. A sealed feedthrough according to claim 2 wherein an "O" ring is passed over said threaded protrusion, whereby when said threaded protrusion is threaded into said first aperture, said "O" ring is squeezed to seal said first aperture.

4. A sealed feedthrough according to claim 1 wherein said header means includes an elongated, non-electrical-conducting member, with first and second ends, and with a plate structure disposed in the middle of said elongated member and disposed orthogonally to the axis of said elongated member.

5. A sealed feedthrough according to claim 4 wherein at said second end of said first half housing means there is included an "O" ring whose outer diameter is substantially the same as said plate structure, whereby when the first end of the elongated member is placed in said first half housing means, said plate structure abuts said "O" ring.

6. A sealed feedthrough according to claim 5 wherein said first half housing means is formed to have an external thread at its second end and wherein said second half housing means is formed to have internal threading at its first end, whereby when said second half housing means is threaded onto said first half housing means, said ram-like abutting means abuts said plate structure which in turn abuts said "O" ring to effect a seal of said hollowed-out section in said first half housing means.

7. A sealed feedthrough according to claim 6 wherein said ram-like abutting means has a fourth aperture therethrough with said fourth aperture having an inside diameter which is large enough to permit said second end of said elongated member to pass therethrough.

8. A sealed feedthrough for connecting first electrical circuitry means, disposed on a first side of a separator wall, with second electrical circuitry means, disposed on a second side of said separator wall, wherein said separator wall has a first aperture therein, comprising in combination:

first half housing means having first and second ends formed to have a hollowed-out section opening into said second end, said first half housing means further having securing means formed at said first end thereof to enable said first half housing means to be secured to said second side of said separator wall, said securing means formed to have a second aperture therethrough, said second aperture disposed to lie in alignment with said first aperture whereby said first electrical circuitry means can pass from said first side of said separator wall, through said second aperture when said securing means is secured to said second side of said separator wall;

header means having third and fourth electrical circuitry means mounted thereon, said header means including an elongated, non-electrical-conducting member, with first and second ends, and with a plate structure disposed in the middle of said elongated member and disposed orthogonally to the axis of said elongated member, said third electrical circuitry means including first electrical terminals secured to said first end of said elongated member, said first electrical terminals disposed to be connectable to said first electrical circuitry means, said fourth electrical circuitry means including second electrical terminals secured to said second end of said elongated member, said plate structure formed to have apertures therein, through which wires are passed to connect said first electrical terminals to said second electrical terminals, said header means further formed to be placed in abutment with said first half housing means to effect a seal of said hollowed-out section of said first half housing means;

second half housing means having first and second ends and formed to have a hollowed-out section which opens into said last-mentioned first end and to have a third aperture in said last-mentioned second end whereby said second electrical circuitry means can be passed through said third aperture to be connected to said second electrical terminals within said hollowed-out section of said second half housing means, and further formed to be joinable with said first half housing means and to have a ram-like abutting means disposed at said last-mentioned first end, whereby when said second half housing means is joined with said first half housing means, said ram-like abutting means pushes said header means to complete a seal of said hollowed-out section of said first half housing means.

9. A sealed feedthrough according to claim 8, wherein said apertures in said plate structure are filled with glass which is bonded to said plate structure to form a seal and wherein said wires pass through said glass to effect a seal of said wires against gasses passing along the surfaces of said wires through said glass.

* * * * *